United States Patent
Reed et al.

(10) Patent No.: US 7,657,023 B2
(45) Date of Patent: Feb. 2, 2010

(54) SPLITTER WALL PLATES FOR DIGITAL SUBSCRIBER LINE (DSL) COMMUNICATION SYSTEMS AND METHODS TO USE THE SAME

(75) Inventors: Vernon Reed, Austin, TX (US); Donald W. True, Austin, TX (US); David Rackley, Austin, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 494 days.

(21) Appl. No.: 11/760,426

(22) Filed: Jun. 8, 2007

(65) Prior Publication Data

US 2008/0304656 A1 Dec. 11, 2008

(51) Int. Cl.
*H04M 1/00* (2006.01)
*H04M 9/00* (2006.01)

(52) U.S. Cl. .................................. 379/399.01; 379/442

(58) Field of Classification Search ............ 379/390.02, 379/398, 394, 399.01, 413.02, 441, 442; 375/222

See application file for complete search history.

(56) References Cited

U.S. PATENT DOCUMENTS

| | | |
|---|---|---|
| 6,026,160 A | 2/2000 | Staber et al. |
| 6,137,866 A | 10/2000 | Staber et al. |
| 6,186,826 B1 | 2/2001 | Weikle |
| 6,239,672 B1 | 5/2001 | Lutz, Jr. et al. |
| 6,272,219 B1 | 8/2001 | De Bruycker et al. |
| 6,288,334 B1 | 9/2001 | Hennum |
| 6,371,780 B1 | 4/2002 | Aponte et al. |
| 6,430,288 B1 | 8/2002 | Frazier et al. |
| 6,570,965 B1 | 5/2003 | Isely et al. |
| 6,733,341 B1 | 5/2004 | Bugg |
| 6,738,463 B2 | 5/2004 | Schmokel |
| 6,768,055 B1 | 7/2004 | Gorin |
| 6,782,097 B2 | 8/2004 | Witty et al. |
| 6,804,353 B2 | 10/2004 | Schmokel |
| 6,866,547 B2 | 3/2005 | Bugg |
| 6,868,117 B1 | 3/2005 | Mardinian |
| 6,996,232 B1 | 2/2006 | Staber et al. |
| 7,140,926 B2 | 11/2006 | Bund et al. |
| 2002/0111077 A1 | 8/2002 | Keenum |
| 2004/0057224 A1 | 3/2004 | Kiko |
| 2006/0067522 A1 | 3/2006 | Paulsen |

*Primary Examiner*—Tuan D Nguyen
(74) *Attorney, Agent, or Firm*—Hanley, Flight, & Zimmerman, LLC

(57) ABSTRACT

Splitter wall plates for digital subscriber line (DSL) communication systems and methods to use the same are disclosed. An example apparatus comprises a splitter to separate a digital subscriber line (DSL) signal from a plain old telephone signal (POTS) signal, and a switch to selectively couple a VoIP signal received via a first jack or the POTS signal to a second jack.

26 Claims, 12 Drawing Sheets

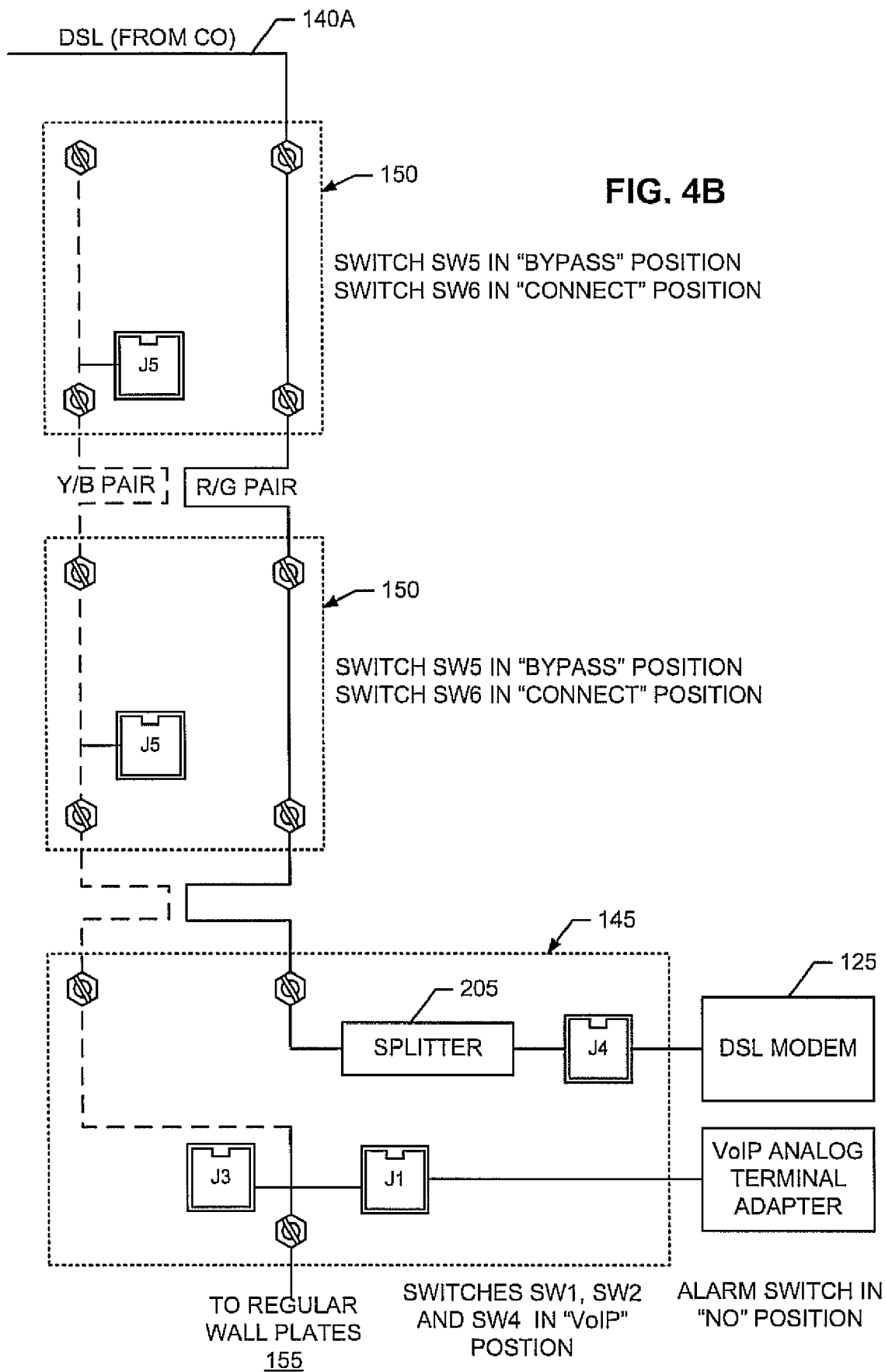

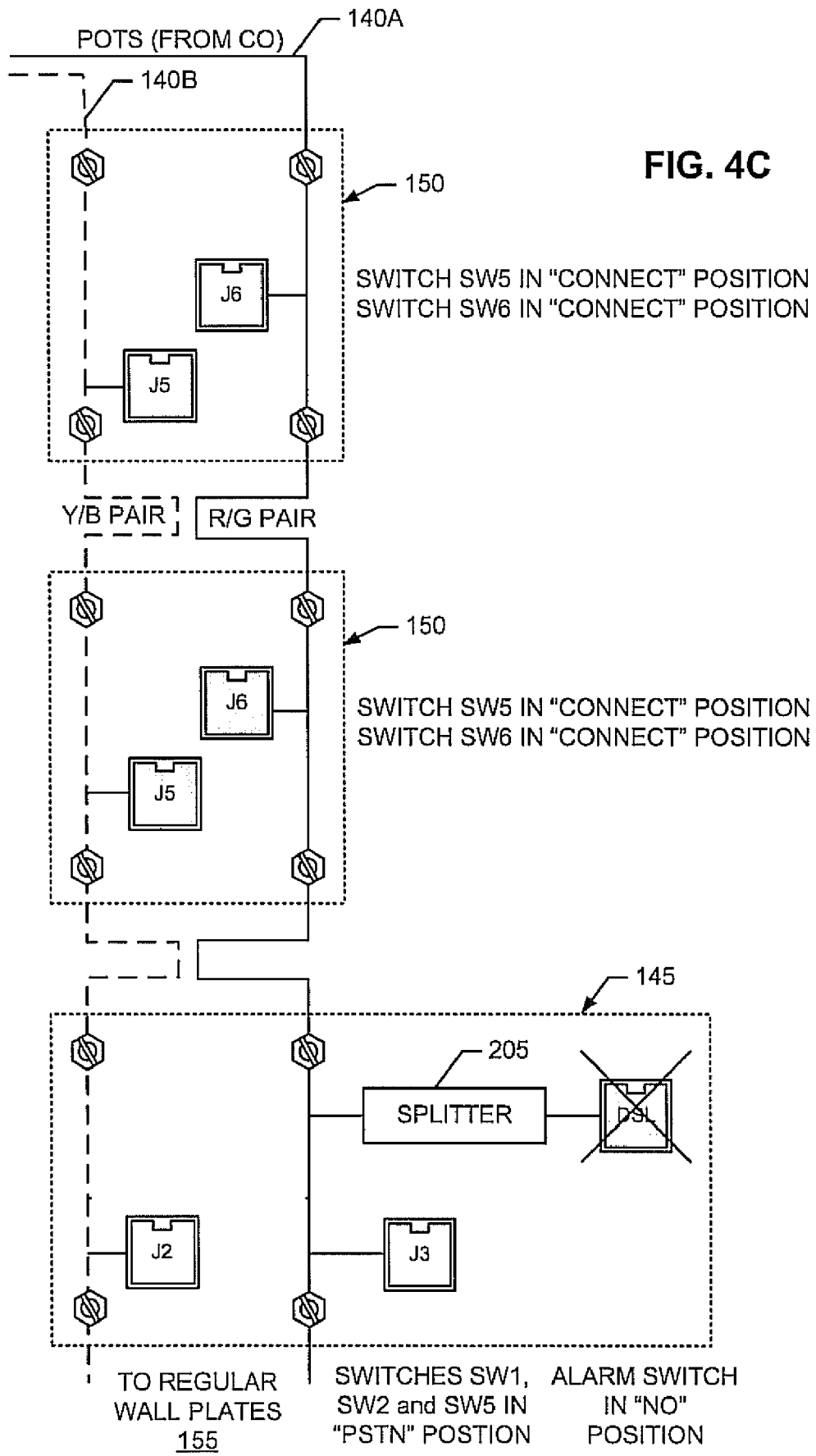

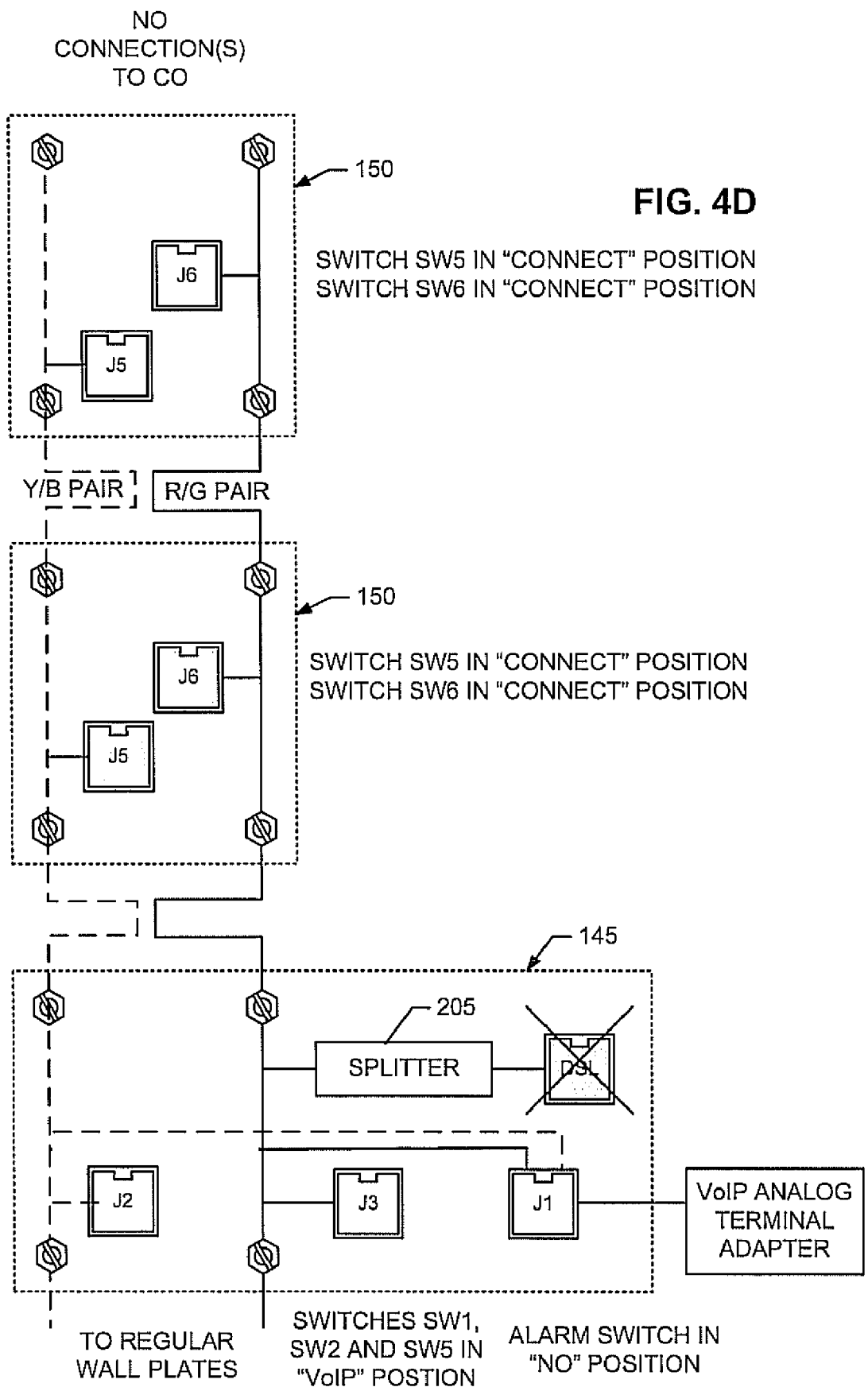

SPLITTER WALL PLATES FOR DIGITAL SUBSCRIBER LINE (DSL) COMMUNICATION SYSTEMS AND METHODS TO USE THE SAME

FIELD OF THE DISCLOSURE

This disclosure relates generally to digital subscriber line (DSL) communication systems and, more particularly, to splitter wall plates for DSL communication systems and methods to use the same.

BACKGROUND

Digital subscriber line (DSL) based communication systems may be used to provide data, telephony, audio, video, television, image, computer and/or Internet based communication services to subscribers, such as, for example, homes and/or businesses (also referred to herein as users, customers and/or customer-premises). DSL technologies enable customers to utilize telephone lines (e.g., ordinary twisted-pair copper telephone lines used to provide Plain Old Telephone System (POTS) services) to connect the customer to, for example, a high data-rate broadband Internet network, broadband service and/or broadband content. For example, a communication company and/or service provider may utilize a plurality of modems (e.g., a plurality of DSL modems) implemented by a DSL Access Multiplexer (DSLAM) at a central office, a remote terminal, a serving terminal and/or another location to provide DSL communication services to a plurality of modems located at respective customer-premises. For ease of discussion, DSL modems located in and/or implemented by a DSLAM (or similar equipment) are referred to herein as CO DSL modems even though such DSL modems and/or DSLAMs may, additionally or alternatively, be located at other locations (e.g., a remote terminal) used to provide DSL services to customer-premises. In general, a CO DSL modem receives broadband service content from, for example, a backbone server and forms a digital downstream DSL signal to be transmitted to a customer-premises DSL modem. Likewise, the CO DSL modem receives an upstream DSL signal from the customer-premises DSL modem and provides the data transported in the upstream DSL signal to the backbone server.

In DSL based communication systems, a DSL signal and a plain old telephone system (POTS) signal (e.g., a public switched telephone network (PSTN) signal) may be transported simultaneously (albeit using different frequencies) across a single telephone line. Splitters are commonly installed, employed and/or utilized at a customer-premises to separate a downstream DSL signal and a downstream POTS signal thereby substantially reducing the effects of telephones, ringing signals, home wiring, etc. on the reception of the DSL signal. Likewise, the splitters also combine an upstream DSL signal and an upstream POTS signal before they are transmitted across the loop from the customer-premises to the CO. Splitters are also commonly utilized to combine and/or separate DSL signals and POTS signals at a central office, remote terminal and/or serving terminal.

Today, some installations of DSL services at customer-premises locations employ so-called "microfilters" which are installed at each telephone jack within a customer-premises to perform the splitting function. For example, a microfilter can be installed between a telephone and a telephone jack to keep signals associated with the telephone (e.g., a ring trip signal) from interfering with the DSL signal. However, the use of microfilters can create bridged taps that can significantly degrade the performance of some DSL modems. Thus, while such distributed splitter arrangements often work sufficiently for asymmetric DSL (ADSL) services, they may be inadequate for higher data rate DSL services, such as very high-speed DSL (VDSL) services.

Other example installations of DSL services at customer-premises locations utilize a splitter installed in a network interface device (NID) located on, for example, the side of a customer-premises. In such examples, a separate wire (e.g. separate from any wire(s) used to carry the POTS signal within the customer-premises) is used and/or installed between the splitter at the NID and the location where the DSL modem will be installed. While such installations may be feasible for single-family residences (e.g., homes), they are often impractical for multiple dwelling unit (MDU) buildings such as, for example, an apartment building, a condominium building, a hotel, a motel, and/or a high-rise residential tower.

BRIEF DESCRIPTION OF THE DRAWINGS

FIGS. 4A, 4B, 4C and 4D illustrate example configurations of the example intermediate wall plates and the example splitter wall plates of FIGS. 1-3.

DETAILED DESCRIPTION

Splitter wall plates for digital subscriber line (DSL) communication systems and methods to use the same are disclosed. A disclosed example apparatus includes a splitter to separate a digital subscriber line (DSL) signal from a plain old telephone signal (POTS) signal, and a switch to selectively couple a VoIP signal received via a first jack or the POTS signal to a second jack.

A disclosed example system includes a first wall plate that includes a digital subscriber line (DSL) splitter to couple a DSL signal to a first jack at the first wall plate and to couple a plain old telephone service (POTS) signal to a switch at the first wall plate, the switch configurable to couple the POTS signal onto a first wire-pair. The disclosed example system further includes a second wall plate to electrically couple a second wire-pair to the DSL splitter at the first wall plate, the second wire-pair to carry a signal comprising the DSL signal and the POTS signal, wherein the first wire-pair is electrically coupled to a second jack at the second wall plate to provide the POTS signal at the second wall plate.

A disclosed example method includes connecting a first wire-pair of a cable to a first set of terminals of a splitter wall plate at the wall plate location, connecting a second wire-pair of the cable at the wall plate location to a second set of terminals of the splitter wall plate, and configuring a switch of the splitter wall plate to couple a plain old telephone service (POTS) signal present on the first wire-pair or a voice over Internet protocol (VoIP) signal present at a first jack of the splitter wall plate to the second wire-pair via the second set of terminals.

In the interest of brevity and clarity, throughout the following disclosure references will be made to connecting a digital subscriber line (DSL) modem and/or a DSL communication service to a customer and/or customer-premises. However, it will be readily apparent to persons of ordinary skill in the art that connecting a DSL modem to a customer and/or customer-premises involves, for example, connecting a first DSL modem operated by a communications company (e.g., a central office (CO) DSL modem implemented by a DSL access multiplexer (DSLAM)) to a second DSL modem located at, for example, a customer-premises (e.g., a home, an apartment, a town home, a condominium, a hotel room, a motel room and/or place of business owned, leased and/or operated by a customer) via a twisted-pair telephone line (i.e., a wire-pair or loop). The customer-premises (e.g., the second) DSL modem may be further connected to other communication and/or computing devices (e.g., a personal computer, a set-top box, etc.) that the customer uses and/or operates to access a service (e.g., Internet access, Internet protocol (IP) Television (TV), etc.) via the CO DSL modem, the customer-premises DSL modem, the wire-pair and the communications company.

Figure 1:
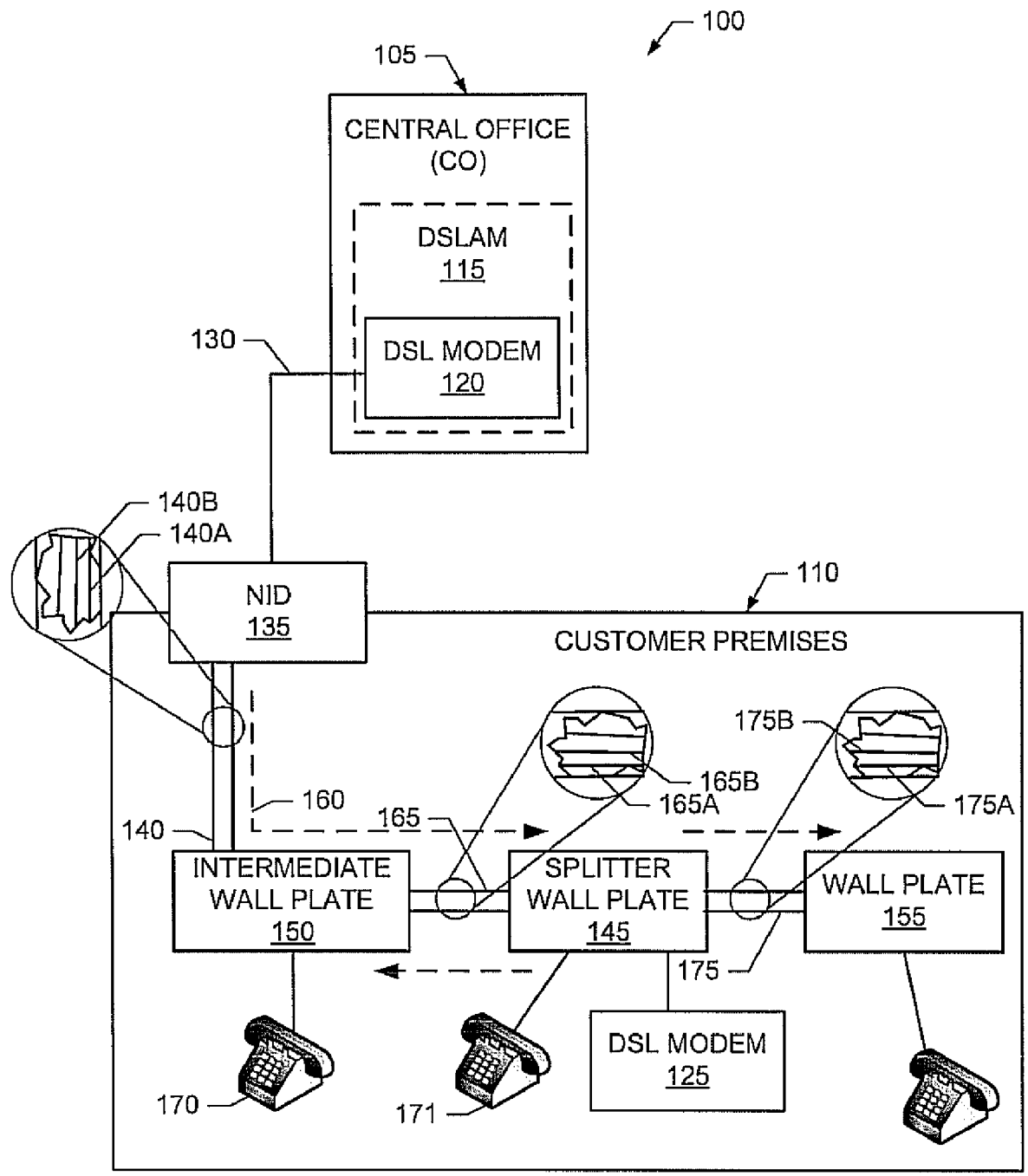
FIG. 1 is a schematic illustration of an example digital subscriber line (DSL) communication system constructed in accordance with the teachings of the invention.

FIG. 1 illustrates an example DSL communication system in which a central office (CO) 105, remote terminal, and/or serving terminal provides data and/or communication services (e.g., telephone services, Internet services, data services, messaging services, instant messaging services, electronic mail (email) services, chat services, video services, audio services, gaming services, etc.) to one or more customer-premises, one of which is designated at reference numeral 110. To provide DSL communication services to the customer-premises 110, the example CO 105 of FIG. 1 includes any number and/or type(s) of DSLAMs, one of which is designated at reference numeral 115. The example DSLAM 115 of FIG. 1 includes one or more CO DSL modems (one of which is designated in FIG. 1 with reference numeral 120) implemented, for example, in accordance with the International Telecommunications Union Telecommunications Sector (ITU-T) G.992.x family of standards for asymmetric DSL (ADSL) modems and/or the ITU-T G.993.x family of standards for very high-speed DSL (VDSL) modems, for respective ones of the customer-premises 110. Likewise, a customer-premises DSL modem 125 is also implemented, for example, in accordance with the ITU-T G.992.x family of standards and/or the ITU-T G.993.x family of standards.

In the illustrated example of FIG. 1, the DSLAM 115 provides the DSL service to the example DSL modem 125 via a DSL subscriber loop 130. DSL subscriber loops are sometimes also referred to in the industry as "loops" and/or "wire-pairs." While throughout this disclosure reference is made to the example DSL subscriber loop 130 of FIG. 1, persons of ordinary skill in the art will readily appreciate that a DSL subscriber loop used to provide a DSL service to a customer-premises location (e.g., the location 110) may include and/or be constructed from one or more segments of twisted-pair telephone wire (e.g., a combination of a feeder one (F1) cable, a distribution cable, a drop cable, and/or customer-premises wiring), terminals and/or distributions points (e.g., a serving area interface (SAI), a serving terminal, a vault and/or a pedestal). Such segments of twisted-pair telephone wire may be spliced and/or connected end-to-end, and/or may be connected at only one end thereby creating one or more bridged taps. Regardless of the number, type(s), gauge(s) and/or topology of twisted-pair telephone wires used to construct the example DSL subscriber loop 130, it will be referred to herein in the singular form but it will be understood to refer to one or more twisted-pair telephone wire segments and may include one or more bridged taps. Moreover, if a passive network interface device (NID) 135 is used to couple the DSL subscriber loop 130 to the DSL modem 125, the DSL subscriber loop 130 includes any cabling 140 within the customer-premises 110 that is used to couple the DSL modem 125 to the NID 135. Persons of ordinary skill in the art will readily appreciate that the example cabling 140 of FIG. 1 may include one or more pairs of wires (i.e., wire-pairs) that are each capable of carrying a POTS and/or a DSL signal. However, if an active NID 135 is used to couple the DSL subscriber loop 130 to the DSL modem 125, the DSL subscriber loop 130 does not include the cabling 140 because in such examples, DSL signals are terminated at the NID 135 (e.g., the DSL modem 125 is implemented at and/or within the NID 135).

As defined by, for example, the ITU-T G.992.x and/or the ITU-T G.993.x family of standards, the example subscriber loop 130 of FIG. 1 may simultaneously transport DSL signals and POTS signals (e.g., a public switched telephone network (PSTN) signal). To separate a downstream DSL signal and a downstream POTS signal at and/or within the example customer-premises 110 (e.g., before the DSL signal is processed and/or received by the DSL modem 125), a splitter wall plate 145, any number of intermediate wall plates (one of which is designated in FIG. 1 with reference numeral 150) and/or any number of traditional wall plates (one of which is designated in FIG. 1 with reference numeral 155) are installed within the example customer-premises 110. The example splitter wall plate 145 also combines an upstream DSL signal (e.g., transmitted by the DSL modem 125) and an upstream POTS signal (e.g., representing words spoken by a user of the phone 170) before they are transmitted across the loop 130 from the customer-premises 110 to the CO 105.

The example splitter wall plate 145 of FIG. 1 is installed at a wall plate location that is near to and/or convenient to the example DSL modem 125. The example intermediate wall plates 150 of FIG. 1 are installed at wall plate locations that are electrically closer (but not necessarily geographically and/or physically closer) to the CO 105 than the example splitter wall plate 145. The example traditional wall plates 155 are installed at wall plate locations that are electrically further (but not necessarily geographically and/or physically further) from the CO 105 than the splitter wall plate 145. Thus, a wall plate location that is convenient to the DSL modem 125 is identified, and then the example splitter wall plate 145 installed at that location. Intermediate wall plates 150 are installed at any wall plate locations (if any) within the customer-premises 110 that electrically between the splitter wall plate 145 and the CO 105, and/or traditional wall plates at those locations are replaced with intermediate wall plates 150. Traditional wall plates 155 within the customer-premises 110 for which the splitter wall plate 145 is positioned electrically between the CO 105 and the traditional wall plates 155 do not need to be adjusted and/or re-wired and may be wired as is traditional.

In the illustrated example of FIG. 1, the intermediate wall plates 150, the example splitter wall plate 145 and the traditional wall plates 155 are arranged and/or electrically coupled in a daisy-chain configuration. However, persons of ordinary skill in the art will readily recognize that the intermediate wall plates 150, the splitter wall plate 145 and/or the traditional wall plates 155 may be arranged, installed and/or electrically coupled in other configurations. For example, if the splitter wall plate 145 is installed at the wall plate location closest to the CO 105, no intermediate wall plates 150 need to be installed. If the splitter wall plate 145 is installed at the wall plate location furthest from the CO 105, no traditional wall plates 155 will be installed. If the customer-premises 110 is wired using, for example, a star wiring configuration, the example splitter wall plate 145 may be installed at the center of the star with traditional wall plates 155 installed at other wall plate locations. Alternatively, for a star configuration, the example splitter wall plate 145 may be installed at a wall plate location different from the center of the star, and the configuration methods described below may then be used to route the POTS signal back to the center of the star and, thus, onto other wall plate locations of the customer-premises 110. Unlike, traditional splitter configurations, the example splitter wall plate 145 of FIG. 1 allows for the simultaneous provisioning of DSL services, POTS services and/or voice over Internet protocol (VoIP) services into multi-dwelling units without a need to install additional wiring which can be prohibitively complex and/or expensive.

As described more fully below in connection with FIG. 3, the example intermediate wall plate 150 of FIG. 1 is installed and/or configured to pass the DSL signal and/or POTS signal 160 carried on a first wire-pair 140A (e.g., a red-green pair) of the example cable 140 to the example splitter wall plate 145 without the signal(s) 160 being exposed to and/or subjected to any bridged taps. That is, the wire-pair 140A is connected at the intermediate wall plate 150 to a first wire-pair 165A (e.g., a red-green pair) of a second cable 165 that electrically couples the intermediate wall plate 150 to the splitter wall plate 145. The wire-pairs 140A and 165A are electrically coupled by the example intermediate wall plate 150 without the creation of a bridged tap at and/or by the intermediate wall plate 150. Likewise, any additional intermediate wall plates coupled between the intermediate wall plate 150 and the splitter wall plate 145 (if any), would likewise pass the signal(s) 160 along to the splitter wall plate 145 without the creation of any bridged tap conditions. Effectively, the intermediate wall plate(s) 150 and the splitter wall plate 145 implement a "home run" wiring configuration for the DSL modem 125 and, thus, substantially reduce the effects of telephone wiring within the customer-premises 110 on the DSL connection speeds achievable by the DSL modem 125. That is, one or more wire-pairs (e.g., the wire-pairs 140A and 165A) are connected end-to-end within the customer-premises 110 without the introduction of any bridged taps.

As described more fully below in connection with FIG. 2, the example splitter wall plate 145 of FIG. 1 couples the wire-pair 165A to a DSL splitter located at and/or implemented by the splitter wall plate 145. The splitter separates the DSL signal and the POTS signal 160. The splitter wall plate 145 couples the DSL signal to the DSL modem 125 (e.g., via the example telephone jack J4 of FIG. 2), and couples the POTS signal to a second wire-pair 165B (e.g., a yellow-black pair) of the cable 165. The second wire-pair 165B carries the POTS signal back upstream to each intermediate wall plate 150 (if any). The example intermediate wall plate 150 couples the second wire-pair 165B to a telephone jack J5 (FIG. 3) which may be used to couple the POTS signal to a telephone 170 at the intermediate wall plate 150. The example splitter wall plate 145 also couples the POTS signal to a telephone jack J2, J3 (FIG. 2) which may be used to couple the POTS signal to a telephone 171 at the splitter wall plate 145. The example splitter wall plate 145 further couples the POTS signal onto a first wire-pair 175A (e.g., a red-green pair) of a cable 175 that is electrically coupled to downstream traditional wall plates 155 (if any).

As described more fully below in connection with FIGS. 2, 3 and/or 4A-D, the example intermediate wall plate 150 and/or the example splitter wall plate 145 can be (re-)configured (e.g., by changing the position of one or more switches) to route and/or couple POTS and/or DSL signals within the customer-premises 110 in other ways. Unlike traditional wall plates 155 and/or traditional splitter installations, such configuration changes can be made without having to re-wire the intermediate wall plate 150, the splitter wall plate 145 and/or the NID 135. For example, if DSL service is not (e.g., is no longer) being used and/or is not (e.g., is no longer) provisioned to the customer-premises 110, the example intermediate wall plate 150 and/or the example splitter wall plate 145 can be configured (e.g., by changing the position of one or more switches) to route, couple and/or provide POTS signals substantially like the traditional wall plate 155. Moreover, the example splitter wall plate 145 of FIG. 1 can be configured (e.g., by changing the position of one or more switches) to distribute VoIP telephone signals (e.g., received via the DSL modem 125) within the customer-premises 110 without the creation of bridged taps that may interfere with the DSL signals exchanged with the CO 105 and/or without the VoIP telephone signals interfering with the DSL signals. In some examples, the DSL modem 125 includes a VoIP analog telephone adapter (ATA) that is plugged into another telephone jack J1 (FIG. 2) of the splitter wall plate 145 to couple the VoIP telephone signals to the splitter wall plate 145 and, thus, to the intermediate wall plate 150 and/or the traditional wall plate 155. Further still, the example splitter wall plate 145 of FIG. 1 can be configured (e.g., by changing the position of one or more switches) to support the use of an alarm system, and/or to support the use of home networking technologies (e.g., defined by the Home Phoneline Networking Alliance (HPNA)) via a telephone jack of the example intermediate wall plate 150, the example splitter wall plate 145 and/or the traditional wall plate 155 without causing interference with DSL signals exchanged with the CO 105, and/or without the introduction of detrimental bridged taps.

Figure 2:
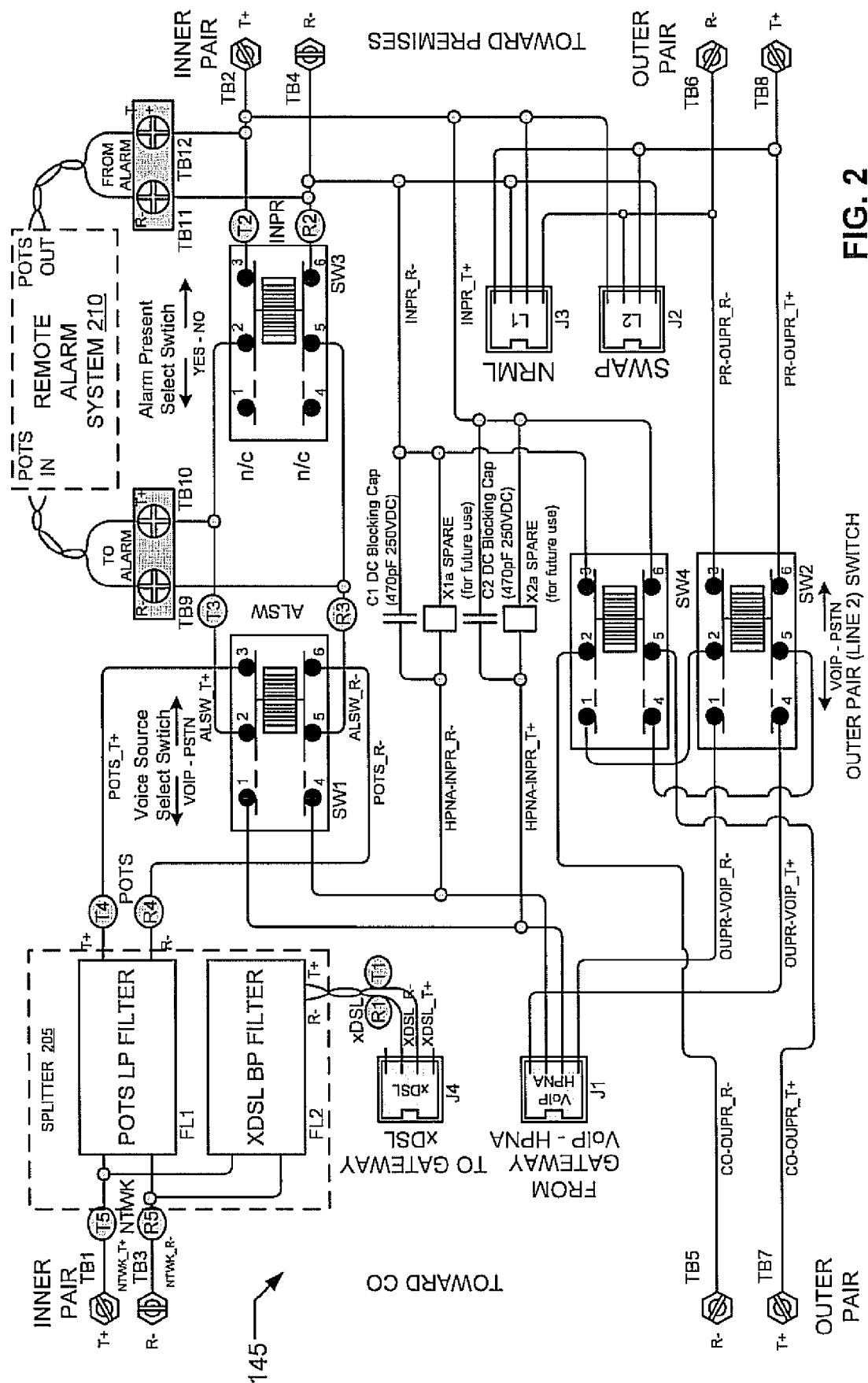
FIG. 2 is an example manner of implementing the example splitter wall plate of FIG. 1.

FIG. 2 illustrates an example manner of implementing the example splitter wall plate 145 of FIG. 1. As described below in connection with FIGS. 5A-5D, the example circuit 145 of FIG. 2 may be implemented as an electronics module (e.g., devices, wires, traces, terminals and/or components mounted to and/or embedded within a printed circuit board (PCB)) that may be attached to, snapped to, mated to, screwed to and/or otherwise affixed to a mounting plate 505 (FIG. 5A) which positions the electronics module within a traditional outlet and/or switch electrical box.

To connect wire-pairs on the CO side of the splitter wall plate 145, the example splitter wall plate 145 of FIG. 2 includes two pairs of screw terminals TB1/TB3 and TB5/TB7. The example pair of screw terminals TB1/TB3 of FIG. 2 is used to electrically couple a first wire-pair (e.g., the example wire-pair 165A of the example cable 165 of FIG. 1) carrying a DSL signal (and possibly a POTS signal) to the splitter wall plate 145 (e.g., via one or more intermediate wall plates 150). The example pair of screw terminals TB5/TB7 of FIG. 2 is used to electrically couple a POTS and/or a VoIP signal back to intermediate wall plates 150 via a second wire-pair (e.g., the example wire-pair 165B of the cable 165).

To connect wire-pairs on the side of the splitter wall plate 145 opposite to the CO 105, the example splitter wall plate 145 of FIG. 2 includes two pairs of screw terminals TB2/TB4 and TB6/TB8. The example pair of screw terminals TB2/TB4 of FIG. 2 is used to electrically couple a POTS and/or a VoIP signal to traditional wall plates 155 via a first wire-pair (e.g., the example wire-pair 175A of the cable 175). Likewise, the example pair of screw terminals TB6/TB8 of FIG. 2 is used to electrically couple a second POTS and/or a VoIP signal to the traditional wall plates 155 via a second wire-pair (e.g., the example wire-pair 175B of the cable 175). The example screw terminals TB1/TB3, TB2/TB4, TB5/TB7 and TB6/TB8 of FIG. 2 are "Fastron" style of screw terminals. However, any type(s) of screws, screw terminals and/or wiring terminals may be used.

To separate DSL and POTS signals, the example splitter wall plate 145 of FIG. 2 includes a splitter 205. The example splitter 205 of FIG. 2 is electrically coupled to the example pair of screw terminals TB1/TB3. An example splitter 205 includes a bi-directional POTS low-pass (LP) filter FL1 that passes POTS signals and attenuates DSL signals, and a bi-direction xDSL band-pass (BP) filter FL2 that passes DSL signals and attenuates POTS signals. One port of the example xDSL BP filter FL2 is electrically coupled to an xDSL telephone jack J4. Using, for example, a traditional telephone cable or a Category 5 (Cat-5) cable (not shown), a DSL gateway and/or router (e.g., the example DSL modem 125 of FIG. 1) can be electrically coupled to the telephone jack J4. The example telephone jack J4 of FIG. 2 is an RJ11 (registered RJ14) top insertion 6P4C jack manufactured by Molex. However, any type of telephone jack may be used.

To allow one or more VoIP telephone signals and/or HPNA signals to be distributed within a customer-premises, the example splitter wall plate 145 of FIG. 2 includes a VoIP/HPNA telephone jack J1. Using, for example, a traditional telephone cable (not shown), a DSL gateway and/or router can be electrically coupled to the VoIP/HPNA jack J1. For example, a DSL gateway/router that includes and/or implements a VoIP analog telephone adapter can provide one or more VoIP telephone signals for distribution within the customer-premises via the example splitter wall plate 145. Additionally or alternatively, a DSL gateway/router that includes and/or implements an HPNA transceiver can provide one or more HPNA signals for distribution within the customer-premises via the example splitter wall plate 145 to facilitate a communication network within the customer-premises 110 via intermediate wall plates (e.g., the example intermediate wall plate 150) and/or traditional wall plates (e.g., the example wall plate 155). The example VoIP/HPNA telephone jack J1 of FIG. 2 is an RJ11 (registered RJ14) top insertion 6P4C jack manufactured by Molex. However, any type of telephone jack may be used.

To provide POTS and/or VoIP signals to a user, the example splitter wall plate 145 of FIG. 2 includes telephone jacks J2 and J3. The example telephone jacks J2 and J3 of FIG. 2 make available to a user the same POTS and/or VoIP signals, albeit using different pairs of contacts of the telephone jacks J2 and J3. In the illustrated example of FIG. 2, signals present on an inner pair of contacts of the telephone jack J2 are present on an outer pair of contacts of the telephone jack J3. Likewise, signals present on an outer pair of contacts of the telephone jack J2 are present on an inner pair of contacts of the telephone jack J3. The presence of the same POTS and/or VoIP signals on different pairs of contacts of the telephone jacks J2 and J3 allows a user to select which of the telephone jacks J2 and J3 to utilize to access a particular POTS and/or VoIP signal. For example, if the example splitter wall plate 145 of FIG. 2 is used to provide two different telephone services (e.g., telephone numbers), the telephone jack J3 can be used to access a first one of the telephone services on the inner pair of the jack J3, and the telephone jack J2 can be used to access a second one of the telephone services on the inner pair of the jack J2. This allows the use of traditional single-line telephones that presume the telephone signal will be present on the inner pair of a telephone jack J2, J3. The example telephone jacks J2 and J3 of FIG. 2 are RJ11 (registered RJ14) top insertion 6P4C jacks manufactured by Molex. However, any type(s) of telephone jacks may be used.

To select whether POTS signals (e.g., present at the screw terminals TB1/TB3) and/or VoIP signals (e.g., present at the VoIP telephone jack J1) are electrically coupled to the example telephone jacks J2 and J3 and the example pair of screw terminals TB2/TB4, the example splitter wall plate 145 of FIG. 2 includes a switch SW1. The example switch SW1 of FIG. 2 is a double-pole double-throw (DPDT) NKK slide type switch. When the example switch SW1 is positioned in a first position (e.g., leftwards in the illustration of FIG. 2), VoIP signals present at the VoIP telephone jack J1 are selected. Likewise, when the example switch SW1 is position in a second position (e.g., rightwards in the illustrated example of FIG. 2), POTS signals present at the screw terminals TB1/TB3 are selected.

To enable the use of an alarm system 210 (when present), that is implemented separately from the example splitter wall plate 145 of FIG. 2, the splitter wall plate 145 includes a switch SW3, and two pairs of screw terminals TB9/TB10 and TB11/TB12. The example pair of screw terminals TB9/TB10 of FIG. 2 may be used to electrically couple the POTS or VoIP signal selected by the example switch SW1 to an input of the alarm system 210. Likewise, the example pair of screw terminals TB11/TB12 of FIG. 2 may be used to electrically couple an output of the alarm system 210 back to the example splitter wall plate 145. The example pairs of screw terminals TB9/TB10 and TB11/TB12 of FIG. 2 are PCB screw terminal manufactured by Keystone Electronics Corp. However, any type(s) of screws, screw terminals and/or wiring terminals may be used.

The example switch SW3 of FIG. 2 is a double-pole double-throw (DPDT) NKK slide type switch. When a remote alarm system 210 is not to be used, the example switch SW3 is positioned in a first position (e.g., rightwards in the illustration of FIG. 2) to connect the signal selected by the example switch SW1 to the example telephone jacks J2 and J3 and the example pair of screw terminals TB2/TB4. When a remote alarm system 210 is to be used, the example switch SW3 is positioned in a second position (e.g., leftwards in the illustration of FIG. 2) to disconnect the signal selected by the example switch SW1 from the telephone jacks J2 and J3 and the screw terminals TB2/TB4. When so positioned, the signal selected by the switch SW1 is electrically coupled to the alarm system 210 via the screw terminals TB9/TB10, and then is electrically coupled back to the example telephone jacks J2 and J3 and the example pair of screw terminals TB2/TB4 via the example pair of screw terminals TB11/TB12.

To select whether POTS signals (e.g., present at the screw terminals TB1/TB3) or VoIP signals (e.g., present at the VoIP telephone jack J1) are electrically coupled to the pairs of screw terminals TB5/TB7 and TB6/TB8, the example splitter wall plate 145 of FIG. 2 includes switches SW2 and SW4. The example switches SW2 and SW4 of FIG. 2 are double-pole double-throw (DPDT) NKK slide type switches. While separate switches SW2 and SW4 are illustrated in FIG. 2, they may be implemented together using a quadruple-pole double-throw (4PDT) switch. When the example switches SW2 and SW4 are both positioned in a first position (e.g., leftwards in the illustration of FIG. 2), VoIP signals present on an outer pair of the VoIP telephone jack J1 are electrically coupled to the pairs of screw terminals TB5/TB7 and TB6/TB8 and the telephone jacks J2 and J3. Likewise, when the example switches SW2 and SW4 are both positioned in a second position (e.g., rightwards in the illustrated example of FIG. 2), POTS signals present at the screw terminals TB1/TB3 are electrically coupled to the pairs of screw terminals TB5/TB7 and TB6/TB8 and the telephone jacks J2 and J3.

As described in detail below in connection with FIGS. 4A-D, the example splitter wall plate 145 of FIG. 2 may be configured by positioning the example switches SW1, SW2, SW3 and/or SW4 to select, couple and/or distribute one or more POTS signals and/or one or more VoIP signals to intermediate wall plates 150 and/or traditional wall plates 155.

While an example manner of implementing the example splitter wall plate 145 of FIG. 1 has been illustrated in FIG. 2, one or more of the telephone jacks, screw terminals, switches, elements, processes and devices illustrated in FIG. 2 may be combined, divided, re-arranged, omitted, eliminated and/or implemented in any of a variety of ways. For example, a so-called "3-port" splitter wall plate 145 can be constructed by omitting the example VoIP/HPNA telephone jack J1, and combining the example switches SW2 and SW4 into a single DPDT switch. Additionally or alternatively, if support for the example alarm system 210 is not required, the example screw terminals TB9/TB10 and TB11/TB12 and the example switch SW3 may be omitted. Further, the example splitter wall plate 145 may include one or more telephone jacks, screw terminals, elements, processes and/or devices in addition to, or instead of, those illustrated in FIG. 2, and/or may include more than one of any or all of the illustrated elements, processes and devices.

Figure 3:
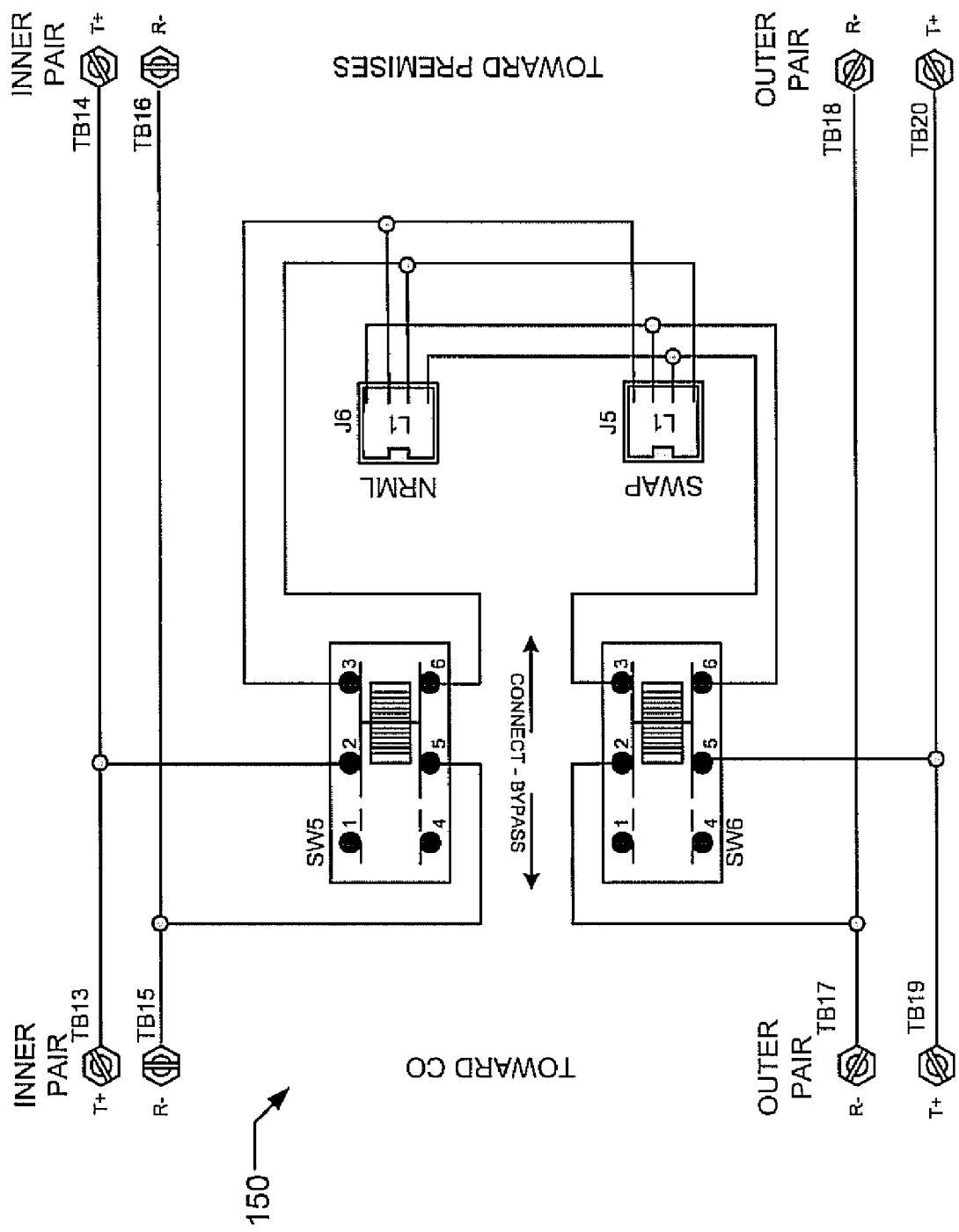
FIG. 3 is an example manner of implementing the example intermediate wall plate of FIG. 1.

FIG. 3 illustrates an example manner of implementing the example intermediate wall plate 150 of FIG. 1. As described below in connection with FIGS. 5A-5D, the example circuit 150 of FIG. 3 may be implemented as an electronics module (e.g., devices, wires, traces, terminals and/or components mounted to and/or embedded within a PCB) that may be attached to, snapped to, mated to, screwed to and/or otherwise affixed to a mounting plate 505 (FIG. 5A) which positions the electronics module within a traditional outlet and/or switch electrical box.

To connect wire-pairs on the CO side of the intermediate plate 150, the example intermediate wall plate 150 of FIG. 3 includes two pairs of screw terminals TB13/TB15 and TB17/TB19. The example pair of screw terminals TB13/TB15 of FIG. 3 is used to electrically couple a first wire-pair (e.g., the example wire-pair 140A of the example cable 140 of FIG. 1) carrying a DSL signal (and possibly a POTS signal) to the intermediate wall plate 150 (e.g., directly from the CO 105 and/or via any number of intermediate wall plates 150). The example pair of screw terminals TB17/TB19 of FIG. 3 is used to electrically couple a POTS and/or a VoIP signal back to another intermediate wall plate 150 closer to the CO 105 and/or to the CO 105 via a second wire-pair (e.g., the example wire-pair 140B of the cable 140). As described below in connection with FIG. 4C, the example pair of screw terminals TB17/TB19 may also be used to electrically couple a second wire-pair carrying a second POTS signal to the intermediate wall plate 150 (e.g., directly from the CO 105 and/or from another intermediate wall plate 150)

To connect wire-pairs on the side of the intermediate wall plate 150 opposite the CO 105, the example intermediate wall plate 150 of FIG. 3 includes two pairs of screw terminals TB14/TB16 and TB18/TB20. The example pair of screw terminals TB14/TB16 of FIG. 3 is used to electrically couple a DSL signal (and possibly a POTS signal) to another intermediate wall plate 150 and/or a splitter wall plate 145 via a first wire-pair (e.g., the example wire-pair 165A of the cable 165 of FIG. 1). Likewise, the example pair of screw terminals TB18/TB20 of FIG. 3 is used to electrically couple a POTS and/or a VoIP signal to the example intermediate wall plate 150 from another intermediate wall plate 150 and/or from a splitter wall plate 145 via a second wire-pair (e.g., the example wire-pair 165B of the cable 165).

In the illustrated example of FIG. 3, the pair of screw terminals TB13/TB15 is electrically coupled to the pair of screw terminals TB14/TB16 to provide a "home run" through the intermediate wall plate 105 independent of the position of the switch SW5. Likewise, the pair of screw terminals TB17/TB19 is electrically coupled to the pair of screw terminals TB18/TB20 to provide a "home run" through the intermediate wall plate independent of the position of the switch SW6. The example screw terminals TB13/TB15, TB14/TB16, TB17/TB19 and TB18/TB20 of FIG. 3 are "Fastron" style of screw terminals. However, any type(s) of screws, screw terminals and/or wiring terminals may be used.

To provide POTS and/or VoIP signals to a user, the example intermediate wall plate 150 of FIG. 3 includes telephone jacks J5 and J6. The example telephone jacks J5 and J6 of FIG. 3 make available to a user the same POTS and/or VoIP signals, albeit using different pairs of contacts of the telephone jacks J5 and J3. In the illustrated example of FIG. 3, signals present on an inner pair of contacts of the telephone jack J5 are present on an outer pair of contacts of the telephone jack J6. Likewise, signals present on an outer pair of contacts of the telephone jack J5 are present on an inner pair of contacts of the telephone jack J6. The presence of the same POTS and/or VoIP signals on different pairs of contacts of the telephone jacks J5 and J6 allows a user to select which of the telephone jacks J5 and J6 to utilize to access a particular POTS and/or VoIP signal. For example, if the example intermediate wall plate 150 of FIG. 3 is used to provide two different telephone services (e.g., telephone numbers), the telephone jack J6 can be used to access a first one of the telephone services on the inner pair of the jack J6, and the telephone jack J5 can be used to access a second one of the telephone services on the inner pair of the jack J5. This allows the use of traditional single-line telephones that presume the telephone signal will be present on the inner pair of a telephone jack J5, J6. The example telephone jacks J5 and J6 of FIG. 3 are RJ11 (registered RJ14) top insertion 6P4C jacks manufactured by Molex. However, any type(s) of telephone jacks may be used.

To select whether the example pairs of screw terminal TB13/TB15 and TB14/TB16 are electrically coupled to the telephone jacks J5 and J6, the example intermediate wall plate 150 of FIG. 3 includes a switch SW5. The example switch SW5 of FIG. 3 is a double-pole double-throw (DPDT) NKK slide type switch. When the example switch SW5 is positioned in a first position (e.g., leftwards in the illustration of FIG. 3), the pair of screw terminals TB13/TB15 is electrically disconnected from the telephone jacks J5 and J6. Likewise, when the example switch SW5 is positioned in a second position (e.g., rightwards in the illustrated example of FIG. 3), the pair of screw terminals TB13/TB15 is electrically coupled to the telephone jacks J5 and J6. When the screw terminals TB13/TB15 are electrically coupled to the telephone jacks J5 and J6, any cable electrically coupled to one or both of the telephone jacks J5 and J6 may create a bridged tap. However, when the example switch SW5 is positioned leftwards in FIG. 3, signals present at the screw terminals TB13/TB15 are electrically coupled to the screw terminals TB14/TB16 substantially without a bridged tap being created at the intermediate wall plate 150.

To select whether the example pairs of screw terminals TB17/TB19 and TB18/TB20 are electrically coupled to the telephone jacks J5 and J6, the example intermediate wall plate 150 of FIG. 3 includes a switch SW6. The example switch SW6 of FIG. 3 is a double-pole double-throw (DPDT) NKK slide type switch. When the example switch SW6 is positioned in a first position (e.g., leftwards in the illustration of FIG. 3), the pair of screw terminals TB17/TB19 is electrically disconnected from the telephone jacks J5 and J6. Likewise, when the example switch SW6 is position in a second position (e.g., rightwards in the illustrated example of FIG. 3), the pair of screw terminals TB17/TB19 is electrically coupled to the telephone jacks J5 and J6. When the screw terminals TB13/TB15 are electrically coupled to the telephone jacks J5 and J6, a POTS signal provided to the intermediate wall plate 150 via the screw terminals TB18/TB20 (e.g., from a splitter wall plate 145 and/or via another intermediate wall plate 150) are electrically coupled to the telephone jacks J5 and J6.

As described in detail below in connection with FIGS. 4A-D, the example intermediate wall plate 150 of FIG. 3 may be configured by positioning the example switches SW5 and/or SW6 to select, couple and/or distribute one or more POTS signals and/or one or more VoIP signals to a splitter wall plate 145, other intermediate wall plates 150 and/or traditional wall plates 155.

While an example manner of implementing the example intermediate wall plate 150 of FIG. 1 has been illustrated in FIG. 3, one or more of the telephone jacks, screw terminals, switches, elements, processes and devices illustrated in FIG. 3 may be combined, divided, re-arranged, omitted, eliminated and/or implemented in any of a variety of ways. Further, the example intermediate wall plate 150 may include one or more telephone jacks, screw terminals, elements, processes and/or devices in addition to, or instead of, those illustrated in FIG. 3, and/or may include more than one of any or all of the illustrated elements, processes and devices.

FIGS. 4A, 4B, 4C and 4D illustrate example configurations of the example splitter wall plate 145 and/or the example intermediate wall plate(s) 150 of FIGS. 1-3 to distribute DSL signals, POTS signals, VoIP signals and/or HPNA signals throughout and/or within a customer-premises 110. In the illustrated examples of FIGS. 4A-D, the customer-premises 110 includes two intermediate wall plates 150, a splitter wall plate 145 and any number of traditional wall plates 155. However, there may be any number of intermediate wall plates 150 (including zero) present. Moreover, the example wall plates of FIGS. 4A-D are electrically coupled in a daisy-chain topology. However, the example splitter wall plates 145, the example intermediate wall plates 150 and/or the traditional wall plates 155 described herein may be wired and/or configured to support other topologies such as, for example, a star topology and/or a mixed daisy chain/star topology.

Figure 4A:
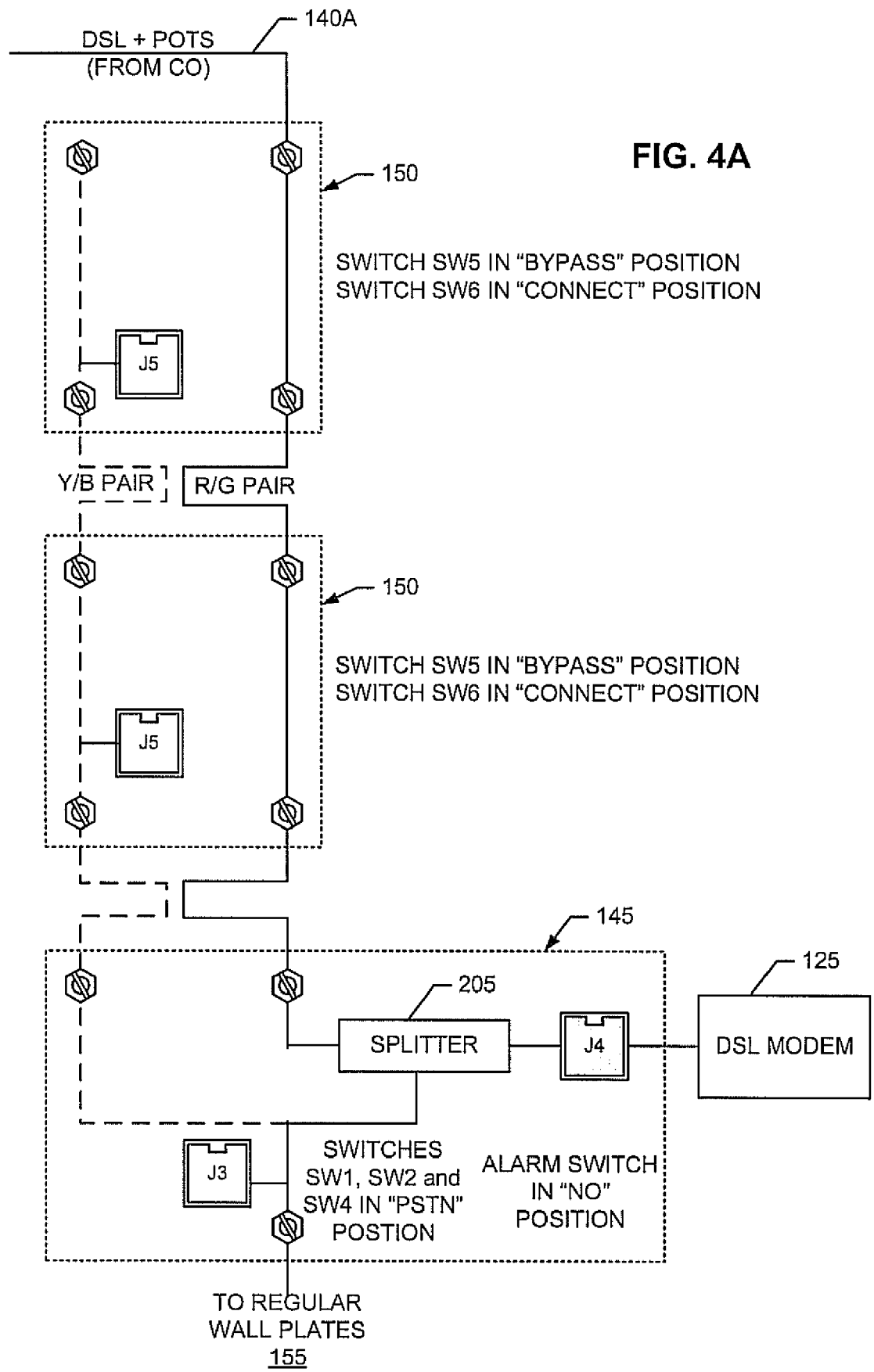

In the illustrated example of FIG. 4A, a wire-pair 140A is used to simultaneously carry DSL and POTS signals. The example intermediate wall plates 150 of FIG. 4A both have switch SW5 in the "bypass" position and switch SW6 in the "connect" position. Thus, the example intermediate wall plates 150 of FIG. 4A pass the combined DSL and POTS signal directly thru to the splitter wall plate 145 without the creation and/or introduction of any bridged taps. As described above in connection with FIGS. 2 and 3, the splitter wall plate 145 provides the POTS signal back to the intermediate wall plates 150. The intermediate wall plates 150 electrically couple the POTS signal to their respective telephone jack J5.

The example splitter wall plate 145 of FIG. 4A has switches SW1, SW2 and SW4 in the "PSTN" position. At the example splitter wall plate 145, the POTS signal is coupled to the telephone jack J3. The POTS signal is also back towards the intermediate wall plates 150 and coupled forward towards any traditional wall plates 155. The DSL signal is electrically coupled to the DSL jack J4 at the splitter wall plate 145.

In the illustrated example of FIG. 4B, a wire-pair 140A is only used carry a DSL signal. The example intermediate wall plates 150 of FIG. 4B are configured identical to those of FIG. 4B. However, in FIG. 4B the signal present at the telephone jacks J5 is a VoIP telephone signal rather than a POTS signal received via the wire-pair 140A.

The example splitter wall plate 145 of FIG. 4B has switches SW1, SW2 and SW4 in the "VoIP" position. As such, VoIP telephone signals electrically coupled to the VoIP/HPNA jack J1 are electrically coupled to the telephone jack J3. The VoIP signals are also coupled back towards the intermediate wall plates 150, and are coupled forward towards any traditional wall plates 155 that are present. Like the example of FIG. 4A, the DSL signal is electrically coupled to the DSL jack J4 at the splitter wall plate 145.

In the illustrated example of FIG. 4C, no DSL signals are present and/or provisioned to the customer-premises 110. As such, the example intermediate wall plates 150 and the example splitter wall plate 145 are configured to route POTS signals associated with two telephone services (e.g., two telephone numbers) within the customer-premises 110. The example intermediate wall plates 150 of FIG. 4C both have switches SW5 and SW6 in the "connect" position. Thus, the example telephone jacks J6 of FIG. 4C can be used to access the POTS signal present on the wire-pair 140A. Likewise, the example telephone jacks J5 of FIG. 4C can be used to access the POTS signal present on the wire-pair 140B.

The example splitter wall plate 145 of FIG. 4C has switches SW1, SW2 and SW4 in the "PSTN" position. Thus, the telephone jack J3 of FIG. 4C can be used to access the POTS signal present on the wire-pair 140A. Likewise, the telephone jack J2 of FIG. 4C can be used to access the POTS signal present on the wire-pair 140B. The splitter 205 is inoperative, bypassed and/or disabled in this example.

In the illustrated example of FIG. 4D, no DSL signals and no POTS signals are provided from and/or to the CO 105. Instead, the example intermediate wall plates 150, the example splitter wall plate 145 and/or the traditional wall plates 155 of FIG. 4D are used to distribute VoIP telephone signals within the customer-premises 110.

The example splitter wall plate 145 of FIG. 4D has switches SW1, SW2 and SW4 in the "VoIP" position. As such, VoIP telephone signals electrically coupled to the VoIP/HPNA jack J1 (e.g., received via another communication device, such as a wireless modem and/or a cable modem, that is electrically coupled to the jack J1) are electrically coupled to the telephone jacks J2 and J3. The VoIP signals are also coupled back towards the intermediate wall plates 150, and are coupled forward towards any traditional wall plates 155 that are present. The splitter 205 is inoperative, bypassed and/or disabled in this example.

Like the example of FIG. 4C, the example intermediate wall plates 150 of FIG. 4D both have switches SW5 and SW6 in the "connect" position. Thus, the telephone jacks J6 of FIG. 4C can be used to access a first VoIP signal present at the VoIP/HPNA jack J1. Similarly, the telephone jack J5 can be used to access a second VoIP signal present at the VoIP/HPNA jack J1.

FIGS. 5A, 5B, 5C and 5D illustrate an example manner of constructing any or all of the example splitter wall plates 145 and/or the example intermediate wall plates 150 of FIGS. 1-3. While an example splitter wall plate 145 is illustrated in FIGS. 5A-D, persons of ordinary skill in the art will readily recognize that intermediate wall plates 150 may be similarly constructed.

Figure 5A:
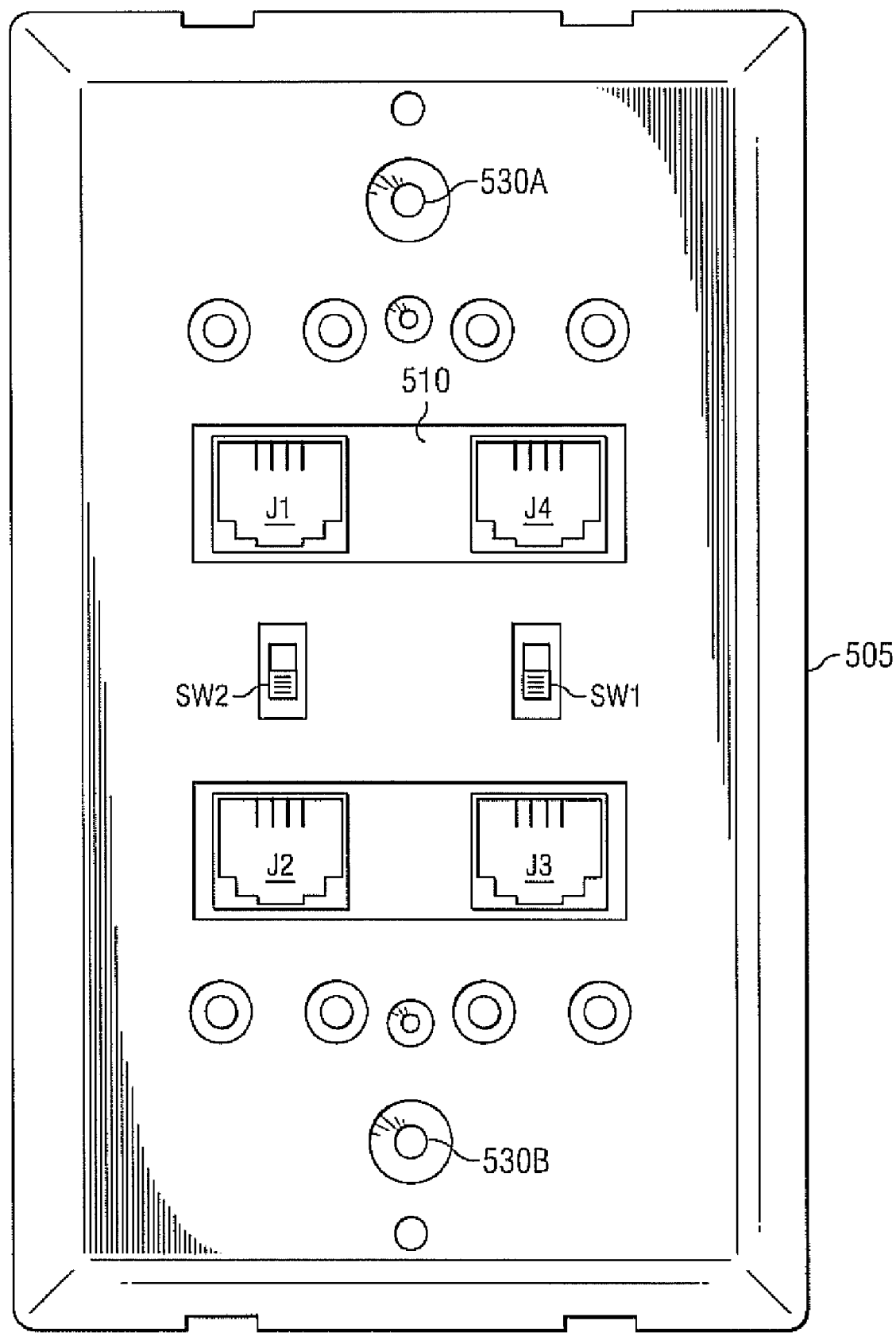
FIGS. 5A, 5B, 5C and 5D illustrate example manners of implementing any or all of the example intermediate wall plates and/or the example splitter wall plates of FIGS. 1-3.
Figure 5B:
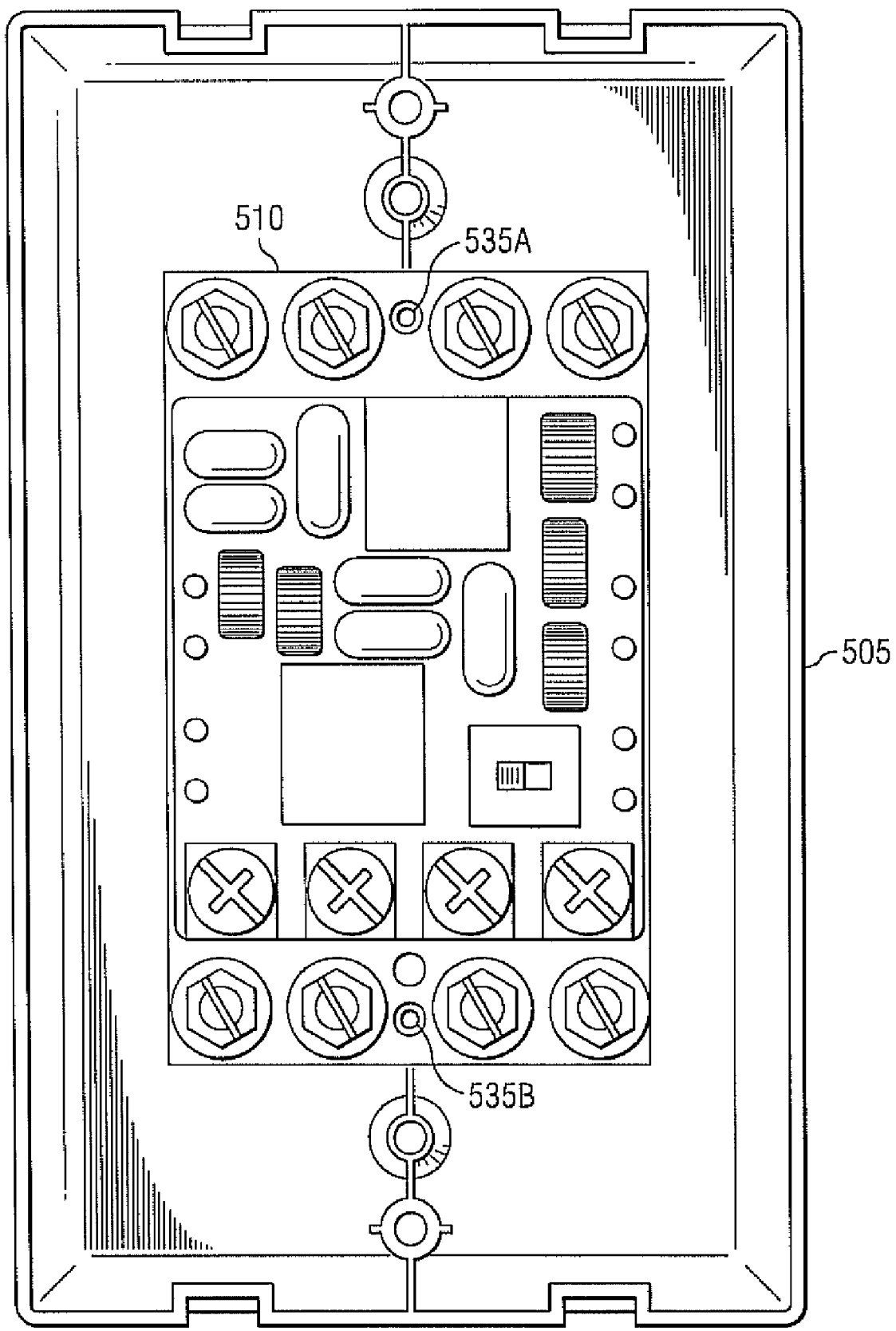

The example splitter wall plate 145 of FIGS. 5A-D is constructed using a mounting plate 505, an electronics module 510, a face plate 515 and a cover 520. As illustrated in FIGS. 5A and 5B, an electronics module 510 (e.g., the example circuit 145 of FIG. 2) is attached to a back side of the mounting plate 505 with access to the example switches SW1 and SW2 and telephone jacks J1, J2, J3 and J4 exposed through a front side of the mounting plate 505. In the illustrated example of FIG. 5A, the example switches SW2 and SW4 are implemented using a single switch SW2.

The example mounting plate 505 of FIGS. 5A-D positions and/or holds the electronics module 510 relative to and/or within a traditional outlet and/or switch electrical box. For example, the mounting plate 505 may include holes 530A and 530B that may be used to secure the mounting plate to an opening of an electrical box using mechanical fasteners such as screws. The electronics module 510 may be attached to the back side of the mounting plate 505 using any number and/or type(s) of fasteners. For example, the electronics module 505 may be screwed to, glued to and/or clipped to the mounting plate 505. Alternatively, there may be protrusions 535A and 535B on the back of the mounting plate onto which the electronics module 505 "snaps" into place.

Figure 5C:
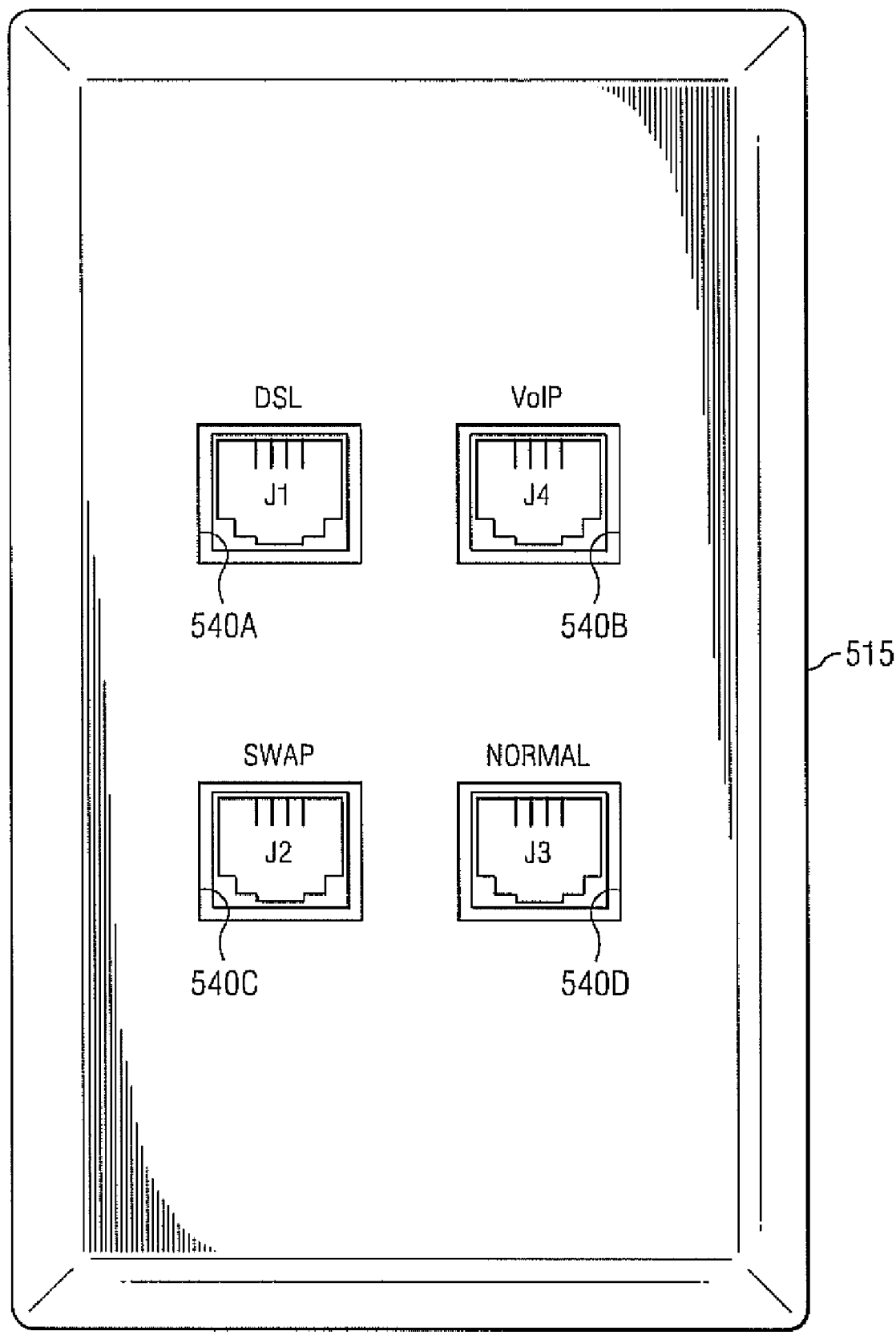
Figure 5D:
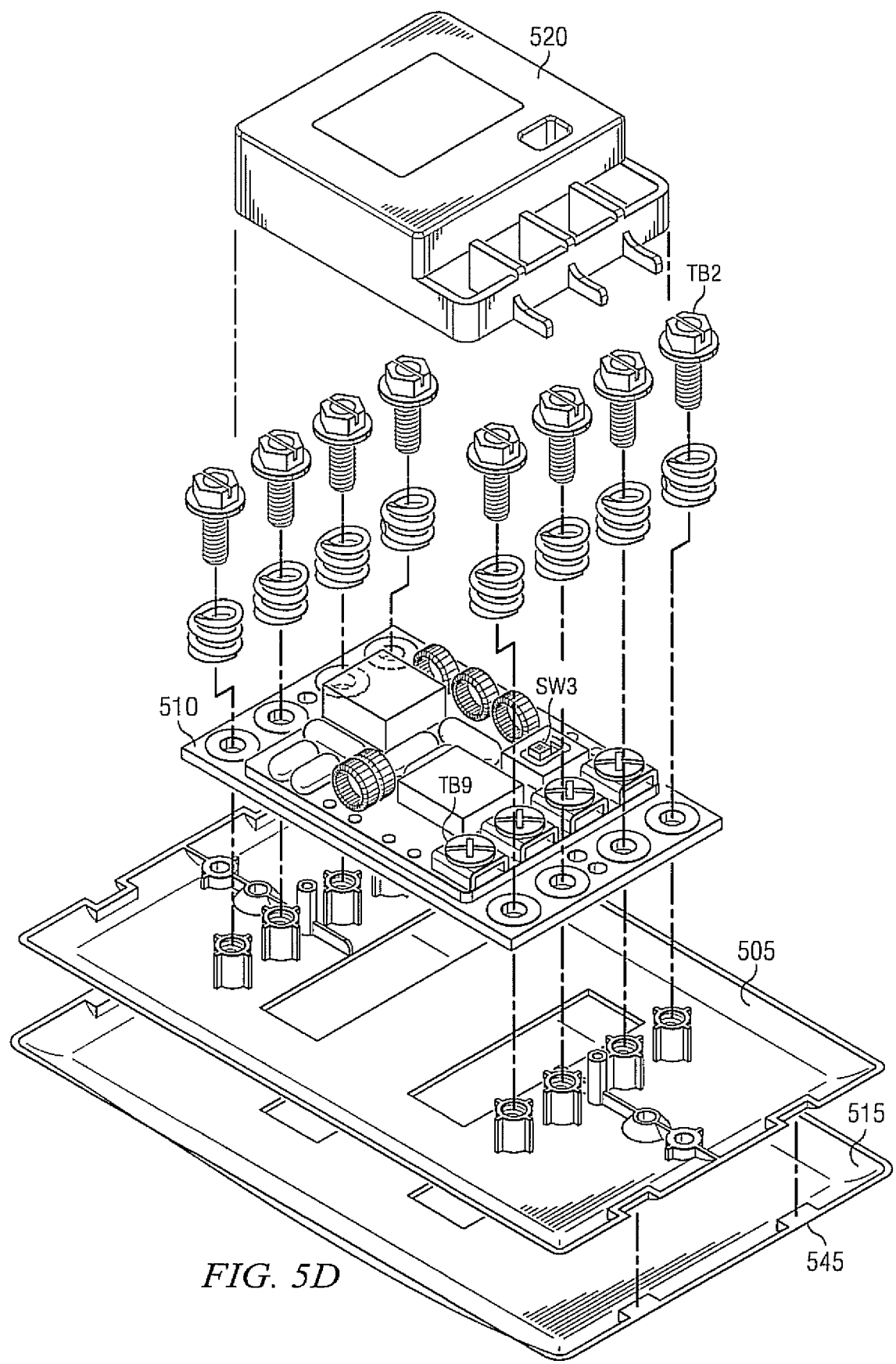

The example face plate 515 of FIGS. 5C and 5D attaches to the front side of the mounting plate 505 to obscure from vision, for example, the switches SW1 and SW2 and/or any fasteners used to attach the mounting plate 505 to an electrical box. As illustrated in FIG. 5C, the face plate 515 has openings 540A, 540B, 540C and 540D that correspond to the positions of the telephone jacks J1, J2, J3 and J4. As illustrated more clearly in FIG. 5D, the example face plate 515 snaps onto the mounting plate 505 by means of one or more protrusions and corresponding receptacles 545.

To prevent unintended contact with electrical components of the electronics module 510, a back cover 520 is attached over the backside of the electronics module 510. The example back cover 520 of FIG. 5D blocks access to components of the electronics module 510 while leaving access to the screw terminals (e.g., the example screw terminal TB2) used to electrically couple wire-pairs to the splitter wall plate 145. The example back cover 520 also provides access to the alarm switch SW3 as well as the screw terminals (e.g., the example screw terminal TB9) used to electrically couple an alarm system to the splitter wall plate 145.

Figure 6:
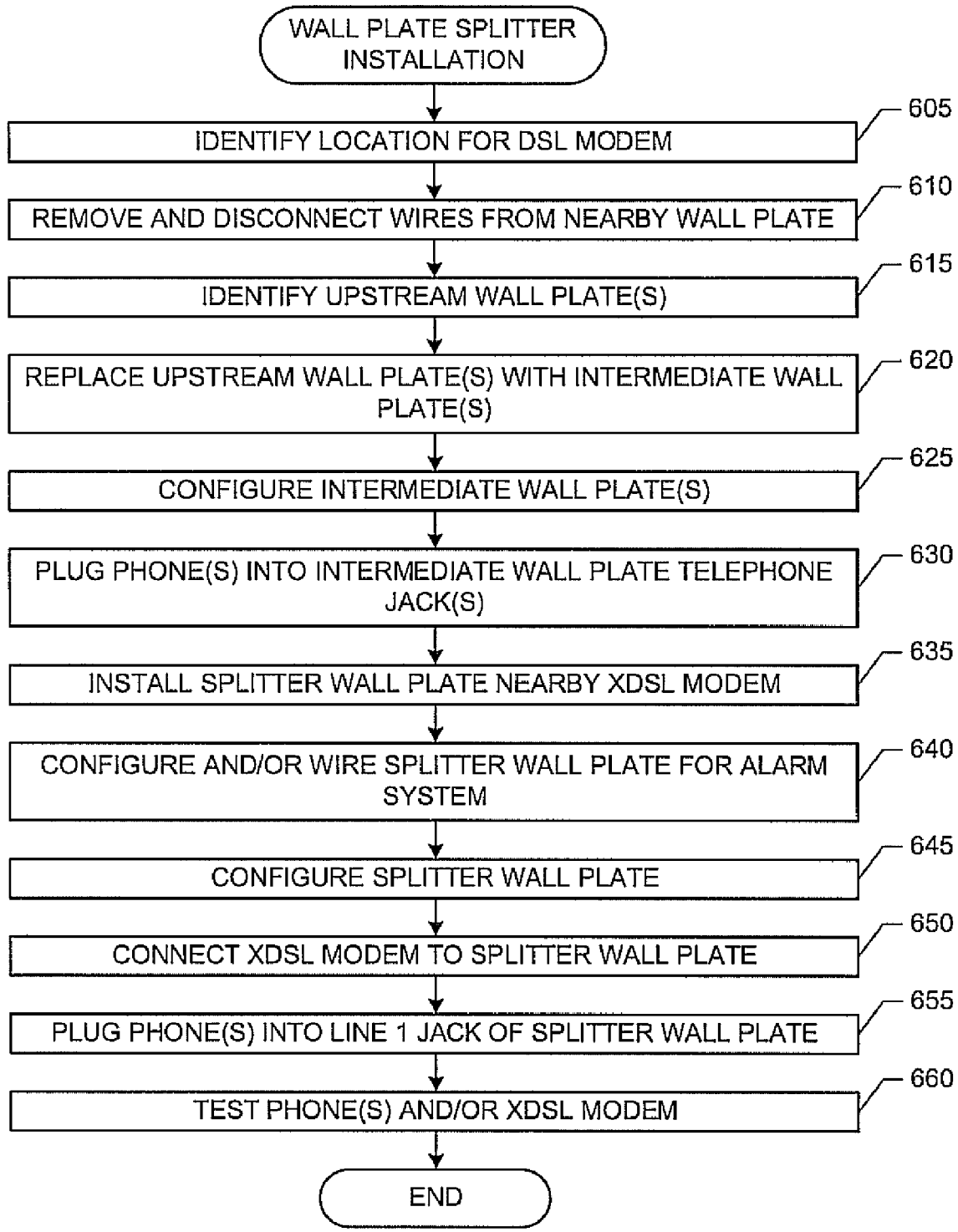
FIG. 6 is a flowchart representative of an example process which may be performed to install any or all of the example intermediate wall plates and/or the example splitter wall plates of FIGS. 1-3, and/or to implement any or all of the example configurations of FIGS. 4A-4D.

FIG. 6 is a flowchart representative of an example process which may be carried out to install and/or configure any or all of the example splitter wall plates 145 and/or the example intermediate wall plates 150 of FIGS. 1-3 and/or 5A-5D. Although the example process of FIG. 6 is described with reference to the flowchart of FIG. 6, persons of ordinary skill in the art will readily appreciate that many other methods of installing and/or configuring any or all of the example splitter wall plates 145 and/or the example intermediate wall plates 150 of FIGS. 1-3 and/or 5A-5D of FIG. 6 may be employed. For example, the order of execution of the blocks may be changed, and/or one or more of the blocks described may be changed, eliminated, sub-divided, or combined.

The example process begins with a user (e.g., a customer, an installer, and/or a service technician) identifying a location for a DSL modem (block 605). The user remove a wall plate near the DSL modem and disconnects any wires from the wall plate (block 610). In disconnecting the wires from the removed wall plate, all wall plates that are downstream from the removed wall plate (e.g., electrically further from the CO 105) should no longer have an active POTS and/or DSL signal. It may be necessary, in some instances, to cut wires at the removed wall plate location to disconnect downstream wall plates.

The user identifies upstream wall plate locations (e.g., wall plate locations electrically closer to the CO 105) by identifying wall plate locations that still have an active POTS and/or DSL signal (block 615). The user replaces each upstream wall plate with one of the example intermediate wall plates 150 described herein (block 620). Depending on whether DSL signals, POTS signals and/or VoIP signals are to be present (e.g., in accordance with one of the example configurations of FIGS. 4A-D), the user configures the switches of the intermediate wall plates 150 (block 625). As desired and based upon the configuration of the intermediate wall plate(s), the user plugs one or more telephones into the appropriate telephone jack(s) of the intermediate wall plates (block 630).

At the location where the wall plate was removed (e.g., near the DSL modem), the user installs a splitter wall plate (e.g., one of the example splitter wall plates 145 described herein) (block 635). Depending on whether an alarm system is in use and/or to be used, the user configures the splitter wall plate (e.g., by positioning the example switch SW3) and electrically coupling wiring from the alarm system to the splitter wall plate (block 640). Depending on whether DSL signals, POTS signals and/or VoIP signals are to be present (e.g., in accordance with one of the example configurations of FIGS. 4A-D), the user configures the switches of the splitter wall plate (block 645).

If DSL service is and/or is to be active, the user electrically couples a DSL modem to the DSL telephone jack of the splitter wall plate (e.g., to the example telephone jack J4 of FIG. 2) (block 650). As desired and based upon the configuration of the wall plate(s), the user plugs one or more telephones into the appropriate telephone jack(s) of the splitter wall plate (block 655). The user then tests and/or confirms that telephones within the customer-premises and/or the DSL modem is able to function properly and/or as expected (block 660). The example installation and/or configuration process of FIG. 6 is then ended.

To the extent the above specification describes example components and functions with reference to particular devices, standards and/or protocols, it is understood that the teachings of the invention are not limited to such devices, standards and/or protocols. For instance, DSL, POTS, VoIP, IP, Ethernet over Copper, fiber optic links, DSPs, the ITU-T G.993.x family of standards and/or the ITU-T G.992.x family of standards represent examples of the current state of the art. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising: a splitter to separate a digital subscriber line (DSL) signal from a plain old telephone signal (POTS) signal; wherein the splitter comprises a POTS low-pass filter and a DSL band-pass filter and a switch to selectively couple a voice over Internet protocol (VoIP) signal received via a first jack or the POTS signal to a second jack.

2. An apparatus as defined in claim 1, further comprising a set of terminals to electrical couple a wire-pair to the splitter, the wire-pair to carry the DSL signal and the POTS signal.

3. An apparatus as defined in claim 1, further comprising a set of terminals to electrical couple the VoIP signal or the POTS signal to a wire-pair, the wire-pair electrical to be coupled to a third jack at another location.

4. An apparatus as defined in claim 1, further comprising a third jack, wherein the DSL signal is coupled to the third jack, further comprising a face plate to facilitate use of the first, second and third jacks.

5. An apparatus as defined in claim 1, further comprising:
a second switch to selectively disconnect the POTS signal from the second jack and to couple the POTS signal to a first set of alarm system terminals; and
a second set of alarm system terminals electrically coupled to the second jack.

6. An apparatus as defined in claim 1, further comprising a face plate to facilitate use of the first and second jacks.

7. An apparatus as defined in claim 6, wherein the face plate is sized to substantially correspond with a telephone jack switch plate.

8. An apparatus as defined in claim 1, further comprising an electronics module to house the splitter, the switch, the first jack and the second jack.

9. An apparatus as defined in claim 8, further comprising a mounting plate to position the electronics module within an electrical wiring box.

10. An apparatus as defined in claim 9, wherein the electrical wiring box is at least one of an electrical outlet box or an electrical switch box.

11. An apparatus as defined in claim 9, further comprising a face plate to facilitate use of the first and second jacks, wherein the face plate is structured to affix to a front side of the mounting plate, and the mounting plate is structured to position the electronics module relative to the face plate.

12. An apparatus as defined in claim 9, further comprising a cover attached to a back side of the mounting plate to obscure a portion of the electronics module.

13. A system comprising: a first wall plate that includes a digital subscriber line (DSL) splitter to couple a DSL signal to a first jack at the first wall plate and to couple a plain old telephone service (POTS) signal to a switch at the first wall plate, the switch configurable to couple the POTS signal onto a first wire-pair; and a second wall plate to electrically couple a second wire-pair to the DSL splitter at the first wall plate, the second wire-pair to carry a signal comprising the DSL signal and the POTS signal, wherein the first wire-pair is electrically coupled to a second jack at the second wall plate to provide the POTS signal at the second wall plate and wherein the second wall plate comprises a second switch, the second switch configurable to disconnect the second wire-pair from a third jack at the second wall plate to substantially eliminate a bridged tap at the second wall plate.

14. A system as defined in claim 13, further comprising a third wall plate located between the first and second wall plates to electrically couple the first and the second wire-pairs between the first and the second wall plates, wherein the first wire-pair is electrically coupled to a third jack at the third wall plate to provide the POTS signal at the third wall plate.

15. A system as defined in claim 13, wherein the first wire-pair is disconnected at the second wall plate from a third wire-pair provided by a telephone service provider.

16. A system as defined in claim 13, wherein the second wall plate includes a second switch to disconnect the second jack from the first wire-pair.

17. A system as defined in claim 13, wherein the first wall plate further includes a terminal to couple the POTS signal to an alarm system and a second terminal to couple an output of the alarm system onto the first wire-pair.

18. A system as defined in claim 17, wherein the first wall plate further includes a second switch to select which of the output of the alarm system or the POTS signal is coupled onto the first wire-pair and to the first jack.

19. A system as defined in claim 13, wherein the first wall plate further includes a third jack to couple a voice over Internet protocol (VoIP) signal to the first wall plate and a second switch to select which of the VoIP signal or the POTS signal is coupled onto the first wire pair and to the first jack.

20. A method comprising: connecting a first wire-pair of a cable to a first set of terminals of a splitter wall plate at the wall plate location; connecting a second wire-pair of the cable at the wall plate location to a second set of terminals of the splitter wall plate; and configuring a switch of the splitter wall plate to couple a plain old telephone service (POTS) signal present on the first wire-pair or a voice over Internet protocol (VoIP) signal present at a first jack of the splitter wall plate to the second wire-pair via the second set of terminals; further comprising identifying a second wall plate location communicatively disposed between the wall plate location and a central office; installing an intermediate wall plate at the second wall plate location, the intermediate wall plate to couple the second wire-pair of the cable to a second jack at the intermediate wall plate, the second jack to provide the POTS signal or the VoIP signal at the intermediate wall plate.

21. A method as defined in claim 20, further comprising:
configuring a second switch of the splitter wall plate to disconnect the POTS signal or the VoIP signal from the second set of terminals, and to connect the POTS signal or the VoIP signal to a third set of terminals of the splitter wall plate;
coupling the third set of terminals to a first port of an alarm system; and
coupling a second port of the alarm system to a fourth set of terminals of the splitter wall plate, the fourth set of terminals being electrically coupled to the second set of terminals.

22. A method as defined in claim 20, further comprising electrically coupling a DSL modem to a second jack of the splitter wall plate, wherein the splitter wall plate is to couple a DSL signal to the second jack.

23. A method as defined in claim 20, further comprising electrically coupling a telephone to a second jack of the splitter wall plate, wherein the splitter wall plate is to couple the POTS signal or the VoIP signal to the second jack.

24. A method as defined in claim 20, further comprising electrically coupling a VoIP analog telephone adapter to the first jack of the splitter wall plate.

25. A method as defined in claim 24, further comprising electrically coupling a DSL modem to a second jack of the splitter wall plate, wherein the DSL modem comprises the VoIP analog telephone adapter.

26. A method as defined in claim 20, further comprising connecting at the wall plate location a first wire-pair of a second cable to a third set of terminals, the third set of terminals electrically coupled to the first jack, wherein the first-wire pair of the second cable is electrically coupled to a second jack at a second wall plate location, the wall plate location communicatively disposed between a central office and the second wall plate location, and the second jack to provide the selected one of the POTS signal or the VoIP signal at the second wall plate location.

* * * * *